(12) United States Patent
Kuhn et al.

(10) Patent No.: US 6,614,385 B2
(45) Date of Patent: Sep. 2, 2003

(54) POLICE ACTIVITY TRANSPONDER UTILIZING A VEHICLE INTERFACE

(75) Inventors: John Kuhn, West Chester, OH (US); Steven K. Orr, Cincinnati, OH (US)

(73) Assignee: Escort Inc., Cincinnati, OH (US)

( * ) Notice: Subject to any disclaimer, the term of this patent is extended or adjusted under 35 U.S.C. 154(b) by 0 days.

(21) Appl. No.: 10/022,820

(22) Filed: Dec. 17, 2001

(65) Prior Publication Data

US 2002/0113727 A1 Aug. 22, 2002

Related U.S. Application Data (60) Substitute for application No. 09/889,656 on Mar. 15, 2002, which is a continuation-in-part of application No. PCT/US00/16410, filed on Jun. 14, 2000.
(60) Provisional application No. 60/145,394, filed on Jul. 23, 1999, and provisional application No. 60/139,097, filed on Jun. 14, 1999.

(51) Int. Cl.[7] .............................. G01S 13/00; G01S 7/40
(52) U.S. Cl. .............................. 342/51; 342/20; 342/42; 342/43; 342/50; 342/104; 342/118; 340/425.5; 340/438; 340/439
(58) Field of Search .............................. 342/20, 42, 43, 342/44–58, 175, 195, 104, 105, 106, 107, 109, 115, 118, 125; 340/901–905, 907, 933, 934–943, 988–996, 425.5, 438, 439–479, 505

(56) References Cited

U.S. PATENT DOCUMENTS

| | | |
|---|---|---|
| 4,492,952 A | 1/1985 | Miller |
| 4,539,642 A | 9/1985 | Mizuno et al. |
| 4,581,769 A | 4/1986 | Grimsley et al. |
| 4,631,542 A | 12/1986 | Grimsley ..................... 342/20 |
| 4,876,527 A | 10/1989 | Oka et al. |
| 4,954,828 A | 9/1990 | Orr .............................. 342/20 |
| 4,986,385 A | 1/1991 | Masaki |
| 5,038,102 A | 8/1991 | Glasheen |
| 5,049,885 A | 9/1991 | Orr .............................. 342/20 |
| 5,058,698 A | 10/1991 | Yoshida et al. |
| 5,079,553 A | 1/1992 | Orr .............................. 342/20 |
| 5,127,487 A | 7/1992 | Yamamoto et al. |

(List continued on next page.)

FOREIGN PATENT DOCUMENTS

JP        9027096 A      1/1997

OTHER PUBLICATIONS

Terratrip—Rally Computers Product Information (with manuals), http://www.terratrip.com, (Jul 16, 2002), 11 pages.

Small Systems Specialists, *The ALFA–Pro Dual Odometer/Clock*, ALFA–Pro Rally Odometer owners manual, http://rally.cc/prmanual/htm, (Jul. 12, 2002), 10 pages.

Small Systems Specialists, *Using your car's Vehicle Speed Sensor*, ALFA Checkpoint Rally Clock—Instruction manual, http://rally.cc/subaru.htm, (Jun. 3, 2002), 2 pages.

*Primary Examiner*—Bernarr E. Gregory
(74) *Attorney, Agent, or Firm*—Wood, Herron & Evans, L.L.P.

(57) ABSTRACT

A police activity transponder utilizes data available through a vehicle on-board diagnostic system or a intelligent vehicle data bus to adjust the sensitivity of the police activity transponder to law enforcement signals based on speed data. A police activity transponder is configured to read speed data available through an on-board diagnostic system or an intelligent vehicle data bus and using an internal clock, calculate a 0 to 60 mile per hour or a quarter mile time for display and function as a speedometer. A police activity transponder is configured to read engine revolutions per minute (rpm) data and function as a tachometer. A police activity transponder is configured to allow a user to input shift points, read engine rpm data, and provide a user indication.

23 Claims, 3 Drawing Sheets

U.S. PATENT DOCUMENTS

| | | | |
|---|---|---|---|
| 5,134,406 A | 7/1992 | Orr | 342/20 |
| 5,153,512 A | 10/1992 | Glasheen | |
| 5,164,729 A | 11/1992 | Decker et al. | 342/20 |
| 5,177,685 A | 1/1993 | Davis et al. | |
| 5,206,500 A | 4/1993 | Decker et al. | |
| 5,250,951 A | 10/1993 | Valentine et al. | 342/20 |
| 5,300,932 A | 4/1994 | Valentine et al. | 342/20 |
| 5,305,007 A | 4/1994 | Orr et al. | 342/20 |
| 5,347,120 A | 9/1994 | Decker et al. | |
| 5,365,055 A | 11/1994 | Decker et al. | |
| 5,400,034 A | 3/1995 | Smith | 342/103 |
| 5,450,329 A | 9/1995 | Tanner | |
| 5,504,482 A | 4/1996 | Schreder | |
| 5,515,042 A | 5/1996 | Nelson | |
| 5,539,645 A | 7/1996 | Mandhyan et al. | |
| 5,559,508 A | 9/1996 | Orr et al. | |
| 5,668,554 A | 9/1997 | Orr et al. | 342/20 |
| 5,815,092 A | 9/1998 | Gregg, III et al. | |
| 5,929,753 A | 7/1999 | Montague | |
| 5,955,973 A | 9/1999 | Anderson | |
| 5,977,884 A | 11/1999 | Ross | |
| 5,983,161 A | 11/1999 | Lemelson et al. | |
| 6,084,510 A | 7/2000 | Lemelson et al. | |
| 6,154,166 A * | 11/2000 | Sawada et al. | 342/175 |
| 6,201,493 B1 | 3/2001 | Silverman | 342/20 |
| 6,204,798 B1 | 3/2001 | Fleming, III | 340/20 |
| 6,252,544 B1 | 6/2001 | Hoffberg | 342/357.1 |

* cited by examiner

POLICE ACTIVITY TRANSPONDER UTILIZING A VEHICLE INTERFACE

CROSS REFERENCE TO RELATED APPLICATION

This application is a continuation-in-part application of U.S. application Ser. No. 09/889,656 filed Mar. 15, 2002 entitled "Radar Warning Receiver with Position and Velocity Sensitive Functions" which application is fully incorporated herein by reference. application Ser. No. 09/889,656 is a U.S. National Phase of PCT Application Ser. No. PCT/US00/16410, filed Jun. 14, 2000 which is a United States continuation of U.S. Provisional Patent Application Ser. No. 60/139,097, filed Jun. 14,1999, and continuation of U.S. Provisional Patent Application Ser. No. 60/145,394, filed Jul. 23, 1999, both of which are also fully incorporated wherein by reference.

FIELD OF THE INVENTION

The present invention relates to police activity transponders.

BACKGROUND OF THE INVENTION

Most cars and light trucks on the road today have on-board diagnostic (OBD) systems. In an effort to met Environmental Protection Agency (EPA) emission standards, manufacturers started using electronic engine management to control engine functions and diagnose engine problems during the 1970's and early 1980's. Through the years, on-board diagnostic systems came into being and have recently become more sophisticated. OBDII, a standard introduced in the mid-1990's, provides almost complete engine control and monitoring of other parts of the vehicles including the chassis, body and accessory devices, as well as providing a diagnostic control network for the vehicle.

The origin of these systems date back to 1966 when, in an effort to reduce smog in the Los Angeles Basin, the State of California began requiring emission controls on 1966 model cars. Later, in 1968, the federal government extended these controls nationwide. In 1970, Congress passed the Clean Air Act and established the Environmental Protection Agency (EPA). In doing so, Congress charged the EPA with reducing emissions from cars and trucks. The EPA then promulgated a series of emission standards for motor vehicles to meet this mandate. These standards were graduated, becoming ever more stringent on vehicle emissions with time. Further, manufacturers were required to maintain the vehicle within the emission standards for the useful life of the vehicle.

Manufacturers, in an effort to meet these standards, introduced electronic engine management systems that control engine ignition and fuel delivery. These systems included sensors for monitoring various engine parameters. The ignition and fuel delivery are adjusted based on sensor readings so that vehicles comply with the emission standards. Access to these sensors for diagnostic purposes was also provided.

In the beginning each automotive manufacturer had their own engine management system and used signals commensurate with their system. Finally, in 1988, the Society of Automotive Engineers (SAE), established a set of standards for a connector plug and a set of diagnostic test signals. The EPA adapted most of these standards established by the SAE regarding on-board diagnostic programs, as well as some other recommendations. OBDII is an expanded set of standards and practices developed by SAE and adopted by the California Air Resources Board (CARB) and the EPA. The deadline for implementation of OBDII was Jan. 1, 1996.

Manufacturers began incorporating OBDII standards into various models as early as 1994, although some of these early vehicles were not completely compliant with OBDII standards. However, all vehicles manufactured since Jan. 1, 1996 are compliant with the OBDII standard. OBDII provides a universal inspection and diagnosis method to ensure the vehicle is performing to original equipment manufacturer (OEM) standards. A scanner console or tool is connected to the OBDII connector to inspect and diagnose the vehicle.

There are currently three basic protocols in use, each with minor variations on the communication pattern between the on-board diagnostic computer and the scanner console or tool. While there have been some manufacturer changes between protocols in the past few years, as a rule of thumb, Daimler Chrysler products and all European and most Asian imports use International Standards Organization (ISO) 9141 circuitry. General Motors uses SAE J1850 VPW (Variable Pulse Width Modulation), and Ford Motor Company uses SAE J1850 PWM (Pulse Width Modulation) communication patterns.

It is also possible to tell which protocol is used on a specific automobile by examining the dash connector socket. If the connector has a pin in the #7 position and no pin at #2 or #10, then the vehicle has the ISO 9141 protocol. If no pin is present in the #7 position, the vehicle uses a SAE protocol. If there are pins in positions #7 and #2 and/or #10, the vehicle may still use the ISO protocol. While there are three OBDII electrical connection protocols, the command set is fixed according to the SAE J1979 standard.

Pre-OBDII cars had connectors in various positions under the dashboard and hood. However, as part of the standard, all OBDII vehicles have a connector located in the passenger compartment, easily accessible from the driver's seat. Often, the connector is located under the dash or behind or near the ashtray. A cable is plugged into the OBDII J1962 connector and connected to a scanner console or scan tool. This equipment ranges from a simple hand-held meter that provides a coded readout of the various diagnostic functions, up to a large console computer-based unit costing thousands of dollars.

These large units are compatible with all cars and contain software that analyzes the signals received from the car, displays a text or diagramed readout of any malfunctions found and suggests possible solutions to the problems.

Smaller units for the home or small shop technician can provide a variety of levels of data, some approaching the sophistication of the big shop consoles. However, they are usually limited to one OBDII system type, unless adapters can be purchased.

OBDII signals are most often sought in response to a "Check Engine Light" appearing on the dashboard or driveability problems experienced with the vehicle. The data provided by OBDII can often pinpoint the specific component that has malfunctioned, saving substantial time and cost compared to guess-and-replace repairs. Scanning OBDII signals can also provide valuable information on the condition of a used car.

There are other methods to gather data from a vehicle other than using OBDII. One method involves the development of the Intelligent Vehicle Data Bus (IVDB). The IVDB allows all computers within a vehicle to communicate with each other, and potentially makes data used or held by those computers available across the IVDB.

SUMMARY OF THE INVENTION

The present invention provides a method of operating a police activity transponder that utilizes data available from a vehicle on-board diagnostic system or intelligent vehicle data bus.

In accordance with a first aspect of the present invention, a police activity transponder is configured to read speed data available through an OBDII interface or IVDB and adjust the sensitivity of the police activity transponder to law enforcement signals based on the speed data.

In accordance with a second aspect of the present invention, a police activity transponder is configured to read speed data available through an OBDII interface or IVDB and using an internal clock, calculate a 0 to 60 mile per hour or a quarter mile time for display.

In accordance with a third aspect of the present invention, a police activity transponder is configured to read speed data available through an OBDII interface or IVDB and function as a speedometer.

In accordance with a fourth aspect of the present invention, a police activity transponder is configured to read engine revolutions per minute (rpm) data available through an OBDII interface or IVDB and function as a tachometer.

In accordance with a fifth aspect of the present invention, a police activity transponder is configured to allow a user to enter a shift point based on engine rpm, read engine rpm data available through an OBDII interface or IVDB, and provide an indication to the user based on a comparison of the engine rpm data and the shift point.

In accordance with a sixth aspect of the present invention, a police activity transponder is configured to read an OBDII vehicle communication protocol and display diagnostic trouble codes.

The above and other objects and advantages of the present invention shall be made apparent from the accompanying drawings and the description thereof.

BRIEF DESCRIPTION OF THE DRAWINGS

The accompanying drawing, which are incorporated in and constitute part of this specification, illustrate embodiments of the invention, and together with a general description of the invention given above, and the detail description of the embodiments given below, serve to explain the principles of the invention.

DETAILED DESCRIPTION

Figure 1:
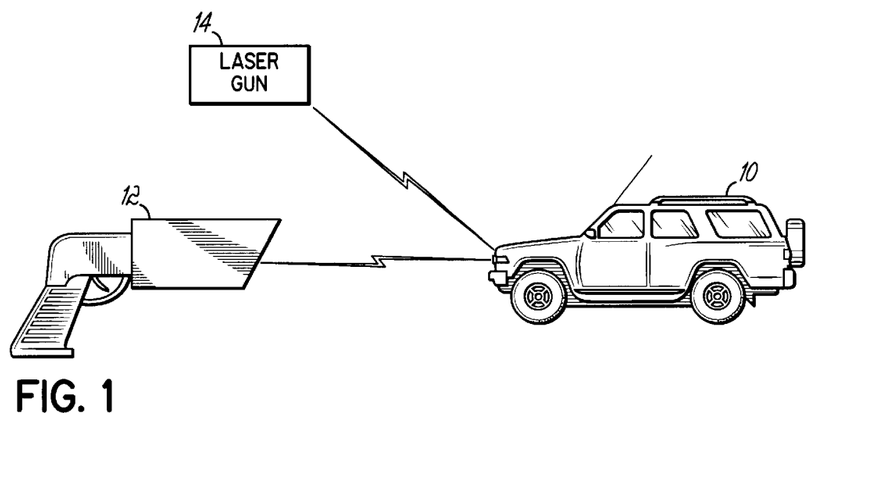
FIG. 1 is an illustration of a vehicle receiving signals from law enforcement agencies.

Referring now to FIG. 1, a vehicle 10 is illustrated in operation on a roadway, under exposure to signals from a variety of sources. For example, as further illustrated, vehicle 10 is under exposure to a radar signal from a law enforcement radar, such as a radar gun 10. Vehicle 10 is also under exposure to a laser signal from a law enforcement laser gun 14. In accordance with principles of the present invention, vehicle 10 is equipped with an on-board diagnostic (OBD) system that complies with OBDII standards. The vehicle 10, further includes a police activity transponder capable of interfacing with the OBDII system. The police activity transponder is able to use vehicle information or data available through the OBDII system to provide enhanced functionality and additional features.

Alternatively, vehicle 10 may be equipped with an Intelligent Vehicle Data Bus (IVDB). When so equipped, the vehicle 10 includes a police activity transponder capable or interfacing with the IVDB to provide enhanced functionality and additional features.

Figure 2:
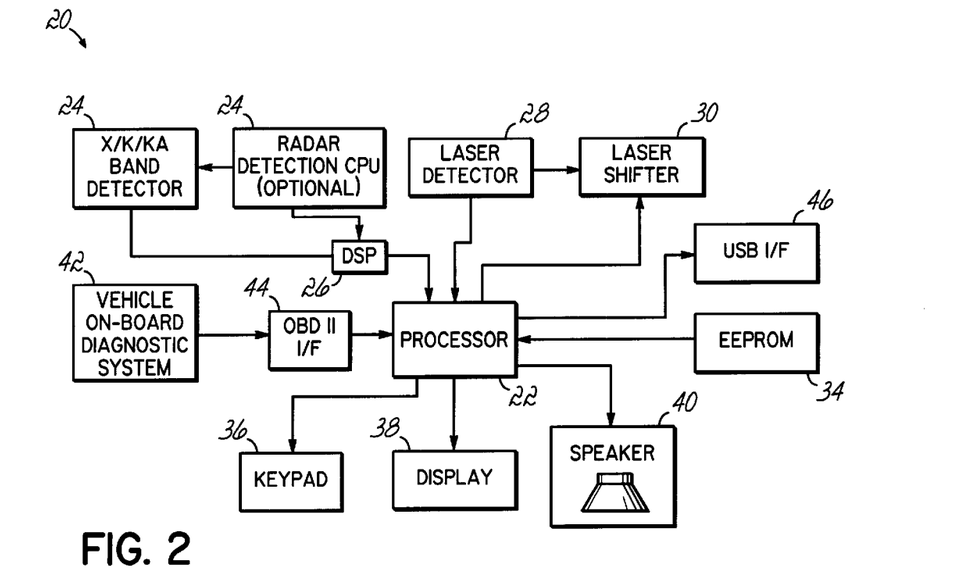
FIG. 2 is an electrical block diagram of a police activity transponder in accordance with principles of the present invention.

Turning now to FIG. 2, the police activity transponder 20 in accordance with principles of the present invention includes a processor 22 for controlling functions of the unit. The processor receives information on radar signals from a conventional microwave receiver 24, coupled to processor 22 via a digital signal processor (DSP) 26. Processor 22 is further connected to a laser detector 28 for detecting laser law enforcement signals, such as LIDAR signals. Processor 28 and laser detector 28 are further connected to laser shifter 30. Laser shifter 30 is capable of emitting a signal back to a laser gun, such as laser gun 14, to prevent a laser gun from measuring the speed of a targeted vehicle, such as vehicle 10.

Processor 22 executes stored program code, found in an electrically erasable programmable read only memory (EEPROM) 34. The processor is programmed to manage and report detected signals in various ways depending on its stored program code.

The police activity transponder further incorporates a user input keypad or switches 36. Alternatively, keypad 36 may constitute input functionality provided by a central display system over an IVDB. Operational commands are conveyed by the user to processor 22 via the keypad. Processor 22 is further connected to a display 38, which may comprise one or more light emitting diodes (LEDs) for indicating various status conditions, or in a more feature-rich device, may include an alphanumeric or graphical display for providing detailed information to a user, elaborated below. Alternatively, display 38 may constitute display functionality provided by a central display system over an IVDB. A speaker 40 is also provided to enable processor 22 to deliver audible feedback to a user under various alert, or warning, conditions.

The police activity transponder 20 further includes an interface 44, such as an OBD II compliant interface, for connection to on-board vehicle diagnostic systems 42 that are built into a vehicle 10. In order to comply with Environmental Protection Agency (EPA) mandates, manufacturers of vehicles have included engine management systems with standardized information systems using the so-called OBD II standard interface. Connectivity with the vehicle through the OBDII interface is available through a port, or connector, commonly located in the passenger compartment, easily accessible from the driver's seat. Often, the connector is located under the dash or behind or near the ashtray. The standard interface is described in "On-Board Diagnostics for Light and Medium Duty Vehicles Standards Manual," 1999 Edition, available through the Society of Automotive Engineers, Inc. The processor 22, using the OBDII standard interface 44, can obtain vehicle speed and other vehicle status information directly from the vehicle, and then may use this information as described in more detail below.

Alternatively, vehicle 10 may be equipped with IVDB. When so equipped, police activity transponder 20 includes an IVDB interface so that processor 22 can obtain vehicle information and access other vehicle computer systems. Such systems may include, but are not limited to: global positioning systems (GPS) and central display systems, often located in the dash of the vehicle.

Current vehicle speed is one of the parameters that is available through the OBDII interface or IVDB. This data can be read and used to provide a variety of features in police activity transponders. One such feature may be referred to as a "variable sensitivity mode." Variable sensitivity mode varies the sensitivity of a police activity transponder based on vehicle speed. For example, when a vehicle is traveling below a certain speed, 25 mph for example, the sensitivity of the police activity transponder would be set to a minimum value. The police activity transponder would still be capable of detecting a very strong signal, but weaker signals would be ignored. As the speed of the vehicle increased, the sensitivity of the police activity transponder would be increased, until a speed is reached where there no longer is a reduction in sensitivity. This might be in the 45 to 50 mph range.

Similarly, speed data may be used to disable a laser shifter. For example, if a vehicle is traveling below a given speed, e.g., 25 miles per hour, a user selected speed, or a speed limit, a laser shifter may be disabled.

Another feature of the present invention allows a police activity transponder 20 to function as a speedometer. In this feature, program code stored in memory, such as memory 34, is configured to process vehicle speed data available from an OBD system 42 or IVDB for display, such as on display 38.

Another feature of the present invention allows a police activity transponder 20 to function as a tachometer. Here, program code stored in memory is configured to process engine revolution per minute (rpm) data available from an OBD system 42 or IVDB for display on display 38.

Another feature of the present invention allows a user to receive a shift indication. Program code stored in memory is configured to allow a user to input shift points based on engine rpm through a keypad, such as keypad 36. The program code then facilitates a comparison between the user entered shift point and engine rpm data available from an OBD system 42 or IVDB, and based on the comparison, provides an indication to a user on display 38.

Yet another feature of the present invention allows a police activity transponder 20 to be used to display error codes available from a vehicle 10 OBD system 42. In this feature, a program is configured so as to cause OBDII interface 44 to emulate a scanner console or tool, as is well known in the art. The program then displays the error or diagnosis trouble codes on display 38.

Figure 3:
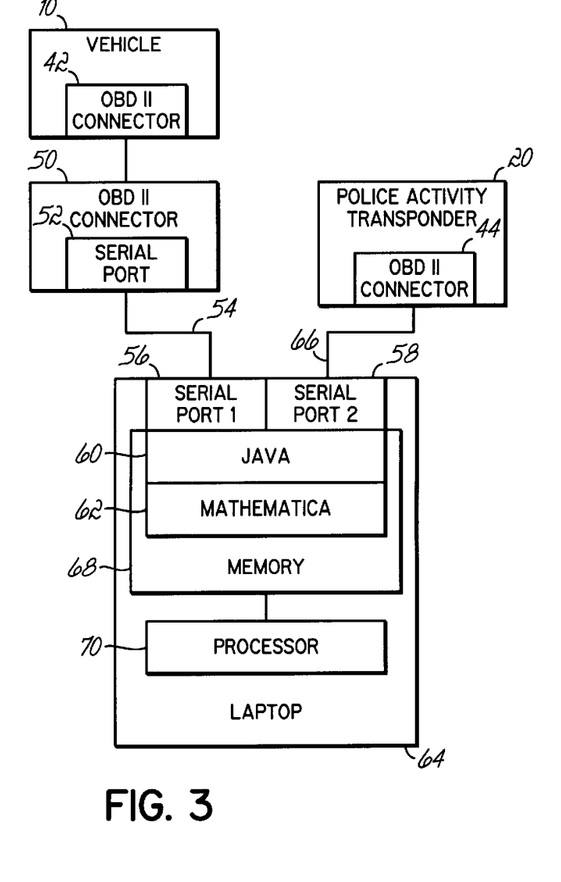
FIG. 3 is a block diagram of a prototype embodiment of the present invention.

Turning now to FIG. 3, a block diagram of a prototype embodiment of the present invention incorporating the variable sensitivity mode feature is illustrated. As depicted, a vehicle 10 manufactured with an engine management system with an OBD system 42 makes vehicle data, such as current vehicle speed data, available.

An OBDII interface 50, such as one manufactured by Multiplex Engineering, is connected to the OBD system 42. The Multiplex Engineering T016-002 or T016-003 interfaces are capable of communication using all three OBDII protocols discussed above. Interface 50 provides the capability to read vehicle data using any one of the three protocols through serial port 52.

A laptop personal computer (PC) 64, containing two serial ports, 56, 58, is connected to the interface 50 and police activity transponder 20, through serial cables 54, 66.

Laptop PC 64 executes program code configured to read vehicle data, calculate an attenuation value, and send the attenuation value to police activity transponder 20, thereby reducing the sensitivity of the police activity transponder. This attenuation value directly controls the police activity transponder sensitivity in real time.

As depicted, the program code is stored in memory 68 and executed by processor 70 to read the speed and calculate the attenuation. The program code is written in Mathematica software 62, with a Java interface 60 for controlling the serial ports. Mathematica may be Purchased from Wolfram Research, Inc., 100 Trade Center Drive, Champaign, Ill. 61820, and may be found online at: www.wolfram.com. However, one skilled in the art will recognize that other code written using other software packages could provide similar functionality without departing from the spirit of the invention.

As such, the program uses two serial ports 56, 58, one to read vehicle data from the OBDII interface 50, and one to write data to the police activity transponder 20. As coded, vehicle speed data is read approximately every second, and averaged to eliminate false alarms due to random noise suggesting unrealistic accelerations and decelerations of the vehicle. As will be appreciated by of ordinary skill in the art, a variety of mathematical functions may be used to achieve a desirable speed versus attenuation relationship. When properly configured, false alarms to signals, such as those from door openers at slow speeds, will be eliminated, while providing full sensitivity to law enforcement signals at higher speeds.

While the embodiment of FIG. 3 illustrates a feature of the present invention, it is not practical for the everyday user. Yet another prototype embodiment of the present invention comprises a microprocessor housed in a stand alone box with two LEDs and a liquid crystal display (LCD). Such a stand alone box takes the place of PC 64 shown in FIG. 3. The microprocessor communicates with an OBDII interface, calculates an attenuation value based on available speed data, and sends the attenuation value to a police activity transponder for use in providing a variable speed sensitivity mode, as well as other features. Additional features include 0 to 60 mile per hour and quarter mile time measurements commonly used for vehicle performance comparisons. The microprocessor also capable of reading available rpm data and illuminating the LEDs to provide shift point indications to a user. It is contemplated that a production embodiment of this prototype may comprise a small circuit board with an on-board microprocessor incorporated into an OBDII connector. As such, a production embodiment would provide an interface to the vehicle, gather data, and send the data to a police activity transponder for display.

An integrated embodiment such as that illustrated in FIG. 2 is also contemplated for commercial production. Turning again to FIG. 2, in this commercial embodiment, OBDII interface 44 decodes the vehicle 10 data available through the vehicle OBD system 42 and provides the data to the police activity transponder 20 thereby facilitating enhanced features and additional functionality. As contemplated, OBDII interface 44 is capable of communication using all three OBDII protocols discussed herein before. Police activity transponder 20 also contains a memory 34 for storing program code that is executed by processor 22 to provide enhanced features and additional functionality. Processor 22 may be an embedded processor, such as a reduced instruction set computer (RISC) or RISC processor, programmed in C.

For example, police activity transponder 20 may be configured to provide functionality that is similar that of the laptop PC 64 and OBDII interface 50 shown in FIG. 3. Thus, such a configuration of police activity transponder 20 would allow variable speed sensitivity, as well as other features of the present invention.

Speed data may also be used to measure 0 to 60 mile per hour and quarter mile times. These are often used for comparison purposes when comparing vehicle performance.

Figure 4:
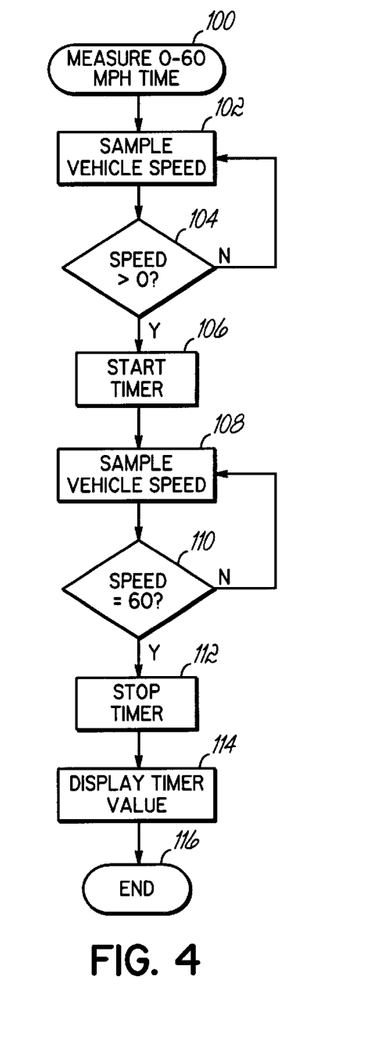
FIG. 4 is a flow chart for a program for measuring a 0 to 60 mph time.

FIG. 4 is a flow chart for a program executed by processor 22 for measuring a 0 to 60 mile per hour time. To activate a 0 to 60 mile per hour function, a user might press a button, or throw a switch, on keypad 36 to start the measurement and thus, the program begins in step 100. In step 102, the processor 22 monitors the vehicle speed data available through the OBD system 42 or IVDB. Next, in step 104, a comparison is made to determine whether the vehicle speed has exceeded zero, indicating that the vehicle has started to accelerate. If the vehicle has not begun accelerating, control is looped backed to sampling vehicle speed data in step 102. However, if the vehicle has begun accelerating, a timer, such as a timer in processor 22, is started in step 106. Sampling the vehicle speed data resumes in step 108. Next, in step 110, another comparison is made to determine whether the vehicle has reached 60 mph. If the vehicle has not reached 60 mph, control is passed back to step 108. However, if the vehicle has reached 60 mph, the timer is stopped in step 112. The value of the timer, representing the 0 to 60 mph time, is then sent to display 38 for display in step 114, and the program ends in step 116.

Figure 5:
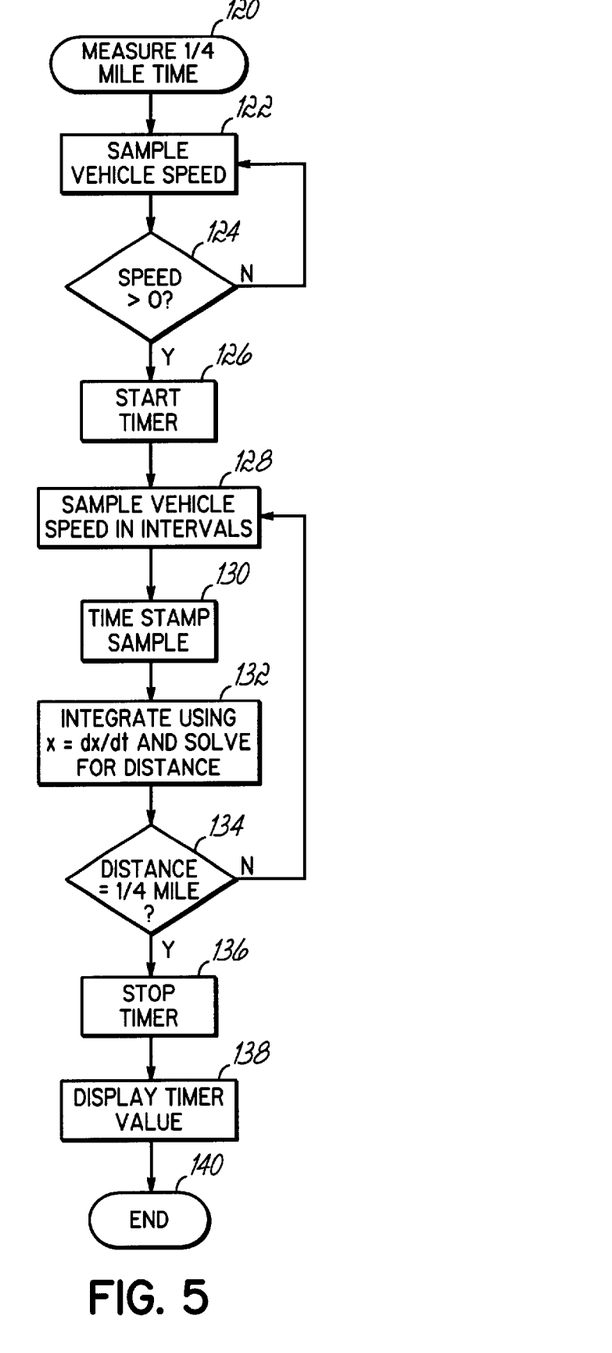
FIG. 5 is a flow chart for a program for measuring a quarter mile time.

Referring now to FIGS. 2 and 5, a quarter mile time may also be measured. To measure a quarter mile time, a user might also press a button, or throw a switch, on keypad 36 to start the measurement, and thus a program 120 for measuring a quarter mile time would commence. Once again in step 122, the processor 22 monitors the vehicle speed data available through the OBD system 42 or IVDB. Next, in step 124, a comparison is made to determine whether the vehicle speed has exceeded zero, indicating that the vehicle has started to accelerate. If the vehicle has not begun accelerating, control is looped backed to sampling vehicle speed data in step 122. However, if the vehicle has begun accelerating, a timer, such as a timer in processor 22, is started in step 126. Next, in step 128, the processor 22 begins sampling the speed data in small time intervals, e.g., between 50 and 100 milliseconds. Each sample is time stamped using the timer in step 130. In step 132, each time stamped sample is integrated, applying an equation that relates distance to speed and time, and thus the distance traveled is calculated. In step 134, if the distance does not equal a quarter mile, sampling continues at step 128. However, if the distance equals a quarter mile in step 134, the timer is stopped in step 136. Thus, the timer value represents the quarter mile time. The timer value is then sent to display 38 for display in step 138 and the program ends in step 140.

The invention in its broader aspects is not limited to the specific details, representative apparatus and method, and illustrative examples shown and described. Accordingly, departures may be made from such details without departing from the spirit or scope of applicant's general inventive concept.

What is claimed:

1. A police activity transponder comprising:
a receiver section receiving signals generated in the context of law enforcement activity, the sensitivity of the receiver section to a law enforcement signal varying in relation to vehicle speed data;
a warning section responding to the receiver section and providing a warning if a received signal correlates to a law enforcement signal; and,
an interface reading the vehicle speed data from a host vehicle.

2. The police activity transponder of claim 1, wherein the receiver section receives electromagnetic radar signals in a radar band.

3. The police activity transponder of claim 1, wherein the receiver section receives signals carried in the visible or infrared spectrum.

4. The police activity transponder of claim 1, wherein the interface is an OBDII compliant interface.

5. The police activity transponder of claim 1, wherein the interface is an IVBD compliant interface.

6. The police activity transponder of claim 1, wherein the warning section is a visible display that makes visible warnings.

7. The police activity transponder of claim 1, wherein the warning section is an audio speaker that makes audible warnings.

8. A police activity transponder comprising:
a receiver section receiving signals generated in the context of law enforcement activity;
an interface reading vehicle speed data from a host vehicle;
a clock section tracking the passage of time;
a display displaying a 0 to 60 mile per hour time; and,
a processor for processing code containing a routine for monitoring the clock section in relation to vehicle speed data and computing a 0 to 60 mile per hour time to be displayed by the display.

9. A police activity transponder comprising:
a receiver section receiving signals generated in the context of law enforcement activity;
an interface reading vehicle speed data from a host vehicle;
a clock section tracking the passage of time;
a display displaying a quarter mile time; and,
a processor for processing code containing a routine for monitoring the clock section in relation to vehicle speed data and computing a quarter mile time to be displayed by the display.

10. A police activity transponder comprising:
a receiver section receiving signals generated in the context of law enforcement activity;
an interface reading vehicle speed data from a host vehicle;
a display displaying vehicle speed; and,
a processor for processing code containing a routine for reading the vehicle speed data and sending the vehicle speed data to the display for display.

11. A police activity transponder comprising:
a receiver section receiving signals generated in the context of law enforcement activity;
an interface reading engine revolutions per minute data from a host vehicle;
a display displaying engine revolutions per minute; and,
a processor for processing code containing a routine for reading the engine revolutions per minute data and sending the number of revolutions per minute to the display for display.

12. The police activity transponder of claim 11, further comprising:

a keypad allowing a user to enter a shift point based on engine revolutions per minute;

the display further displaying a shift indication;

the code further containing a routine that allows a user to enter a shift point from the keypad and send a shift indication to the display for display to a user based on a comparison of the engine revolutions per minute data and the shift point entered by the user.

13. A police activity transponder comprising:

a receiver section receiving signals generated in the context of law enforcement activity;

an interface reading a vehicle communication protocol;

a display displaying diagnosis trouble codes; and, a processor for processing code containing a routine for reading diagnosis trouble codes from the interface and sending them to the display for display.

14. The police activity transponder of claim 13, wherein the protocol is the International Standards Organization 9141 protocol.

15. The police activity transponder of claim 13, wherein the protocol is the Society of Automotive Engineers J1850 variable pulse width modulation protocol.

16. The police activity transponder of claim 13, wherein the protocol is the Society of Automotive Engineers J1850 pulse width modulation protocol.

17. The police activity transponder of claim 13, wherein diagnosis trouble codes are displayed as an alphanumeric.

18. The police activity transponder of claim 13, wherein diagnosis trouble codes are displayed as a series of flashing lights.

19. A police activity transponder comprising:

a receiver section receiving signals generated in the context of law enforcement activity;

a transmitter section transmitting signals in response to received signals, the transmission disabled in relation to vehicle speed data; and, an interface reading the vehicle speed data from a host vehicle.

20. The police activity transponder of claim 19, wherein the receiver section receives electromagnetic radar signals in a radar band and the transmitter transmits electromagnetic signals in a radar band.

21. The police activity transponder of claim 19, wherein the receiver section receives signals carried in the visible or infrared spectrum and the transmitter transmits signals in the visible or infrared spectrum.

22. A police activity transponder comprising:

a receiver section receiving signals generated in the context of law enforcement activity;

an interface reading vehicle speed data from a host vehicle;

a clock section tracking the passage of time;

a display displaying a time for acceleration to a given speed; and, a processor for processing code containing a routine for monitoring the clock section in relation to the vehicle speed data and computing the time taken to reach the given speed to be displayed the display.

23. A police activity transponder comprising:

a receiver section receiving signals generated in the context of law enforcement activity;

an interface reading vehicle speed data from a host vehicle;

a clock section tracking the passage of time;

a display displaying a time for traveling a given distance; and, a processor for processing code containing a routine for monitoring the clock section in relation to the vehicle speed data and computing the time taken to travel the given distance to be displayed the display.

* * * * *

UNITED STATES PATENT AND TRADEMARK OFFICE
CERTIFICATE OF CORRECTION

PATENT NO.   : 6,614,385 B1
DATED        : September 2, 2003
INVENTOR(S)  : Kuhn and Orr It is certified that error appears in the above-identified patent and that said Letters Patent is hereby corrected as shown below:

Title page,
Item [62], Related U.S. Application Data, is incorrect; it should read exactly as Column 1, lines 7-18 read.

Column 1,
Line 10, reads "reference. application" and should read -- reference. Application --.
Line 26, reads "In an effort to met" and should read -- in an effort to meet --.

Column 3,
Line 41, reads "accompanying drawing, which" and should read -- accompanying Drawings, which --.
Line 44, reads "the detail description" and should read -- the detailed description --.
Line 66, reads "radar gun 10" and should read -- radar gun 12 --.

Column 4, reads "transponder capable or" and should read -- transponder capable of --.
Line 22, reads "28 and laser detector 28" and should read -- 22 and lase detector 28 --.

Column 6,
Lines 42-43, reads "The microprocessor also capable" and should read -- The microprocessor is also capable --.

Column 7,
Line 60, reads "of applicant's general" and should read -- of applicants' general --.

Column 10,
Line 23, reads "to be displayed the display" and should read -- to be displayed by the display --.

UNITED STATES PATENT AND TRADEMARK OFFICE
CERTIFICATE OF CORRECTION

PATENT NO.   : 6,614,385 B1
DATED         : September 2, 2003
INVENTOR(S)  : Kuhn and Orr It is certified that error appears in the above-identified patent and that said Letters Patent is hereby corrected as shown below:

<u>Column 10 con'd.,</u>
Line 36, reads "to be displayed the display" and should read -- to be displayed by the display --.

Signed and Sealed this

First Day of June, 2004

JON W. DUDAS
*Acting Director of the United States Patent and Trademark Office*